Patented Oct. 25, 1949

2,486,361

UNITED STATES PATENT OFFICE 2,486,361

CATALYTIC CONVERSION OF HYDROCARBONS

Paul G. Nahin, Lynwood, and Hal C. Huffman, Long Beach, Calif., assignors to Union Oil Company of California, Los Angeles, Calif., a corporation of California No Drawing. Application October 20, 1944, Serial No. 559,650

17 Claims. (Cl. 196—28)

1

This invention relates to catalysts and catalytic processes for processing various hydrocarbons or hydrocarbon mixtures. More particularly, the invention relates to a new and improved method of preparing catalysts of the type comprising a carrier upon which is supported an active catalytic agent.

Catalytic cracking, dehydrogenation, hydrogenation, desulfurization, hydroforming and reforming of hydrocarbons are well known processes. For these processes many catalytic agents have been employed with varying success. Such catalytic agents include the oxides or other compounds of metals such as chromium, molybdenum, cobalt, nickel, zinc, iron, lead, cadmium, vanadium, manganese, tantalum, tungsten, titanium, platinum, columbium, scandium, thorium, uranium, zirconium, tin, copper, etc., which compounds may be produced by an appropriate treatment of the chromates, molybdates, vanadates, sulfates, nitrates, chlorides and other suitable salts of the metals by methods well known in the art. Many of these catalytic agents are effective only when supported on such carriers as alumina, magnesia, magnesium hydroxide, silica, zirconia, titania, thoria, or any combination of these. The oxides or combinations thereof, of chromium, molybdenum, and cobalt, distended on alumina are the preferred catalysts for the above processes. For example, in a process generally described as hydroforming a typically commercially prepared catalyst comprising about 9% molybdenum oxide and 91% of alumina is capable of increasing the aromatic content of a naphtha boiling between 200° F. and 280° F. from about 14.3% to about 58% by volume at a temperature of about 950° F., liquid hourly space velocity of 1, a gage pressure of 100 pounds per square inch and with an added 3,000 cubic feet of hydrogen per barrel of feed. Also in a process generally described as dehydrogenation a catalyst composed of about 5% chromium oxide and 95% alumina is capable of effecting as much as 28% conversion of n-butane to butenes at a temperature of 1,050° F. at substantially atmospheric pressure and a gaseous space velocity of from 15 to 17 volumes per volume of catalyst per minute. Similarly in the desulfurization of hydrocarbon stocks a catalyst composed of about 10% of the combined oxides of cobalt and molybdenum and 90% alumina silica carrier is capable of reducing the sulfur content of a pressure distillate boiling in the range of 100° F. to 400° F. from 3.5 weight per cent to about 0.01 weight per cent at a temperature of 700° F., pressure of 300 pounds per square inch gage, liquid hourly space velocity of 1, and with 3,000 cubic feet of added hydrogen per barrel of feed.

Among processes for preparing catalysts of the above types are those of impregnation and coprecipitation. In preparing such a catalyst by impregnation the carrier in the form of powder, granules or pellets is immersed in a solution of a suitable soluble salt of a desired metal such as ammonium molybdate, chromium nitrate, ammonium dichromate, cobalt nitrate, and the like, whereupon the carrier having adsorbed a portion of the solution is dried and calcined at a temperature in the range of about 400° C. to about 700° C. to convert the adsorbed salt to the oxide of the metal or metals employed. In preparing a catalyst by coprecipitation the process embodies a simultaneous precipitation of the hydrated oxide of the carrier and the hydrated oxide or oxides of the desired catalytic agents from a solution containing appropriate amounts of the suitable soluble salts of the carrier type material and the metal or metals employed as catalytic agent. A modification of this procedure consists of precipitating the hydrous oxides of the catalytic agent in the presence of a wet carrier gel. For example, in preparing a hydro-forming catalyst as described above comprising approximately 9% molybdenum and 91% alumina by the method of impregnation the alumina may be immersed in a solution of ammonium molybdate and in turn dried and calcined at a temperature in the range of 400° C. to about 700° C. to convert the absorbed ammonium molybdate to molybdenum trioxide. Also in preparing a catalyst of the desulfurization type comprising an alumina carrier and a catalytic agent consisting of the combined oxides of cobalt and molybdenum by the method of coprecipitation, a solution of cobalt nitrate may be added to a solution of aluminum nitrate followed by the addition of a solution of ammonium molybdate containing excess ammonium hydroxide whereby the pH of the combined solution is increased to a value greater than 7 which results in the precipitation of the hydrated oxides of aluminum, cobalt and molybdenum therefrom. The gel is then filtered and washed and subsequently dried and calcined to yield a catalyst comprised of aluminum oxide and the combined oxides of cobalt and molydenum.

It has been found that many catalysts heretofore prepared by the method of coprecipitation as described above may be more advantageously prepared by the method of impregnation when such preparation is possible. The catalyst preparation by impregnation is in these cases desirable for several reasons. For example, preparation by impregnation is considerably more practical from an economic standpoint, permits more accurate control of the final catalyst composition, and we have found that in certain cases it gives a more active catalyst on the basis of the percentage of catalytic agent employed.

It is an object of our invention to bring about an advancement in the art of catalyst preparation and more particularly to simplify the preparation of certain catalysts. It is a further object of our invention to bring about improvement in certain catalysts as a result of the simplified and improved preparation method as herein described, and it is a more specific object of our invention to facilitate the preparation of certain catalysts by the process of impregnation.

Other objects and advantages of our invention will occur to those skilled in the art as the description thereof proceeds.

The method of impregnation as employed in the industry consists of impregnating a desired carrier, as described above, with a water solution of the required concentration of the particular metal salt or salts chosen to give the desired catalytic agent in the final catalyst composition. However, there are a great many cataylsts of superior quality which are difficult to prepare by impregnation as a result of the mutual insolubility of the salts of the particular metals employed in the catalyst. Examples of such catalysts are those in which the final catalytic agent consists of both a basic and an acidic metallic oxide such as for example a desulfurization catalyst as described above in which the catalytic agent consists of the combined oxides of cobalt and molybdenum, in which case an acidic molybdenum oxide and a basic cobalt oxide are present. Another example of a cataylst of this type employs as a catalytic agent the combined oxides of nickel and tungsten wherein the tungsten oxide represents an acidic oxide, the nickel oxide a basic oxide. Impregnation of a carrier material with a water solution of these salts is extremely difficult on a commercial scale inasmuch as such a water solution is found to be unsuitable when both basic and acidic oxide-forming metals are present in the solution. For example, in attempting to prepare an impregnating water solution containing both cobalt and moylbdenum ions by the solution of cobalt and molybdenum salts it was found that precipitation occurred in a very few hours after preparation of the solution, and more importantly upon introducing alumina, as a carrier to be impregnated, into the solution, immediate precipitation from the solution occurred which precipitation by its nature negates the desired effect of impregnation. Similar insolubility in water solution was found in the case of the salts of tungsten and nickel and in other cases where basic and acidic oxide-forming metals were present.

Whereas, the object of this invention is to prepare improved catalysts consisting of any of the metals in the above group supported on a carrier, it is a more specific object of the invention to prepare in a more simplified manner the catalyst in which basic and acidic metal oxides are incorporated.

Briefly our invention consists of impregnating the desired carrier with a relatively concentrated ammonium hydroxide solution of a salt of the desired metal or metals. We have found that solutions containing salts of both acidic and basic oxide-forming metals in the range of concentration required to produce an active cataylst in distilled water, in 0.1 normal acid such as nitric acid or hydrochloric acid, or in concentrated ammonium hydroxide, are stable for only short periods varying from a few minutes to several hours precipitating thereafter crystals of unknown composition, and also that upon the addition of carrier granules to be impregnated apparently a seeding effect takes place which causes accelerated precipitation of these unknown crystals. In commercial practice such instability is obviously undesirable.

We have found, however, that by employing the proper concentration of ammonia, solutions could be prepared from such metal salts which are stable over a considerably longer period of time amounting to a matter of weeks and which further are stable upon the addition of the carrier material to be impregnated and which, therefore, may be employed for a number of impregnating operations.

There are certain factors which we have found control the application of the process of our invention. These factors may be listed briefly as follows:

1. The desired concentration of the metal salts in the final solution.
2. The concentration of ammonia in the final solution.
3. The ratio of ammonia to the basic oxide-forming metal in this solution.
4. The concentration of ammonia in the initial solvent.

Although these factors are interrelated to each other and as a group produce the required end product we have been able to establish certain broad limitations on each of these functions, whereby we are able to obtain the desired impregnating solutions. These limitations may be more fully appreciated after a more complete description of the process of my invention.

In a general sense our invention consists of preparing a solution of the desired metal salts in the presence of a relatively definite concentration of ammonia in water to form a complex between the ammonia and the basic oxide-forming metal. The acidic oxide-forming metal may be added to the solution either prior to or after the addition of the basic oxide-forming metal.

In one method of preparing our impregnating solution we may add to ammonium hydroxide of the desired concentration, which concentration as pointed out above is critical within a certain range, a water solution of the desired concentration of a salt of the basic oxide-forming metal. The effect of the addition of this solution to ammonium hydroxide is to bring about an immediate precipitation of the basic hydroxide with practically instantaneous re-solution of the metal due presumably to the formation of a complex between the metal and the ammonia. We have found that to accomplish this re-solution the concentration of ammonia is quite critical inasmuch as the effect cannot be obtained by the addition of this solution of the particular metal salt to concentrated ammonium hydroxide and at the same time it will not be obtained by the addition of the soltuion of the metal salt to a comparatively dilute ammonium hydroxide. To this solution of the basic oxide-forming metal in the presence of ammonia may be added subsequently a salt of the desired acidic oxide-forming metal. Inasmuch as we have found that in the original ammonium hydroxide solution the presence of an ammonium salt increases the solubility or complex formation of the basic oxide-forming metal it may be desirable in those cases in which the acidic oxide-forming metal is in the form of the ammonium salt such as for example ammonium molybdate, ammonium vanadate, ammonium tungstate, or the like, to add these salts to the ammonia solution prior to the addition of the solution of the basic oxide-forming metal. Further we have found it to be desirable for the same reason in certain cases to add to the ammonia solution an ammonium salt such as ammonium chloride, ammonium sulfate, ammonium nitrate, and the like.

Other methods of preparation of the impregnating solution may be employed utilizing the principles of our invention such as the addition of a solid salt of the basic oxide-forming metal to the ammonium hydroxide solution or a reversal of the above procedures wherein ammonium hydroxide solution may be added either to a solution of or to the solid salt of the basic oxide-forming metal. In a still further method of preparation we may bubble anhydrous ammonia through a solution of the salt of a basic oxide-forming metal whereupon an initial hydroxide precipitate of said cation will be formed with subsequent redissolving of said hydroxide when the required concentration of ammonia has been reached. In this latter method of preparation we are able to employ a less concentrated water solution of said salt to prepare a catalyst of the same composition by virtue of the fact that no water is added to said solution with the ammonia. We have found, however, that the preparation of the impregnating solution by the first method in which the solution of a basic oxide-forming metal salt is added to the ammonium hydroxide of the required concentration, which may or may not contain added ammonium salts or the salt of the acidic oxide-forming metal, is the simplest by virtue of the relatively high ratio of ammonia to the metal existing at the time of introduction of the solution to the ammonium hydroxide. Other methods of preparation of such impregnating solutions may occur to those skilled in the art without departing from the spirit or the scope of our invention.

The preparation of the impregnating solution according to the process of our invention is based on the factors as described above, and upon certain limitations that we have found necessary to place on these factors. With respect to the concentration of the metal or metals in the impregnating solution the range of .20 molar to about 1.5 molar has proved to be satisfactory for most of the catalysts prepared. There may, however, be unusual circumstances in which concentrations below or above this range are desirable. Such concentrations are considered to be within the scope of this invention.

The two most important factors in the successful preparation of a solution of the type described, in which is incorporated a salt of a basic oxide-forming metal, are the concentration of ammonia in the final solution and the mole ratio of ammonia to this metal. With respect to the latter, the ratio of ammonia to the basic oxide-forming metal must be at least twice the ionic charge of said metal in the solution in order to insure the re-solution of the hydroxide formed. This ratio may be increased to any desirable figure, which figure, however, will be automatically controlled by the desired molar concentration of both the metal and the ammonia in the final solution. We have found that it is necessary for the molar concentration of ammonium ion in this solution to be within the range of 5 to 15 molar and preferably within the range of 7 to 9 molar. By examination of these factors it will be seen that the limits of one will impose in certain instances limits on the others. For example, in the preparation of a solution of 0.2 molar concentration of a metal having a positive charge of 2, the ratio of ammonia to this metal could be satisfied according to the third of the above limitations by molar concentration of 0.8, however, according to the second of the above limitations it is necessary to have a molar concentration of ammonia at least in the neighborhood of 4, which concentration would automatically set the mole ratio of ammonia to said metal at 20 to 1. Similarly if with the particular salt involved it is desired to have a higher molar concentration of ammonia in the final solution the mole ratio of ammonia to the metal will be even higher than the value of 20 to 1. On the other hand, if it is desired to have a solution of 1.3 molar concentration of a basic oxide-forming metal in an oxidation state of 3 by the limitations imposed in 3 above the mole ratio of the ammonia to said metal will necessarily be at least 6 to 1, preferably higher than 6 to 1, whereby in this particular instance the limitation in two above will automatically be set at a minimum molar concentration of ammonia in the final solution of 7.8.

In the preferred method of preparation the fourth limitation is encountered consisting of the concentration of ammonia in the initial solvent employed; that is, if a water solution of a basic oxide-forming metal is added to a solution of ammonium hydroxide to form the subsequent complex, we have found that the concentration of ammonia in the ammonium hydroxide prior to the addition of said solution must be in the range of 8 to 15 molar, preferably in the range of 12 to 14 molar. This fourth limitation is applicable as stated above only to the preparation by the addition of the metallic salt solution to the ammonia and is varied to a certain extent by the addition to the ammonia solution of ammonia salts which have the effect of accelerating the complex formation, and thereby reducing to a certain extent the required ammonium hydroxide concentration in the solution when they are employed. A probable explanation for this required ratio of ammonia to water for the production of stable acidic and basic oxide-forming metal compounds may lie in the formation of complex aqua-ammonia metal compounds or ions one class or the other of which due to solvent mass action effect becomes insoluble or comparatively insoluble in either moderate excess of water or ammonia.

We may use the process of this invention to prepare catalysts consisting of one or more of the oxides or other compounds of the metals listed above and preferably one or more of the oxides or other compounds of the metals of the left hand column of group VI, and the fourth series of group VIII of the periodic table which classifications include chromium, molybdenum, tungsten, uranium, iron, cobalt and nickel which compounds may be distended on an adsorbent type carrier consisting of alumina, silica, zirconia, thoria, magnesia, magnesium hydroxide, titania, or any combination of these.

Catalysts of these types may be employed in many and varied hydrocarbon conversion reactions such as desulfurization, reforming, hydroforming, dehydrogenation, cracking, and the like. For example, in the process of desulfurization we may employ a catalyst consisting of the combined oxides of cobalt and molybdenum supported on a silica stabilized alumina carrier to desulfurize hydrocarbon fractions or combinations of such fractions or even crude oil at temperatures in the range of about 600° F. to about 1,000° F. and at pressures in the range of atmospheric to about 1,000 pounds per square inch or higher and with space velocities of 0.2 to 4.0 or higher, which conditions are determined by the stock to be desulfurized.

Whereas, we have found that catalysts comprising from about 5% to about 45% of the combined oxides of cobalt and molybdenum distended on a carrier consisting of alumina which has been activated and contains from 1% to 15% and preferably about 4% to about 8% of silica are good desulfurization catalysts, we have further found that from about 8% to about 15% and preferably about 9% to about 12% of the combined oxides of cobalt and molybdenum give the best desulfurization as a function of the amount of these oxides employed. Although the cobalt and molybdenum oxides may be present in the proportion of about ½ to 5 moles of cobalt oxide to 1 mole of molybdenum oxide we have found that ratios from about 0.8 to 1.5, and preferably about 0.9 to about 1.2, moles of cobalt to 1 mole of molybdenum, present in the amounts as indicated above, give the best desulfurizing results.

Also in a process generally termed "hydroforming" we may employ a catalyst, prepared by a method hereinbefore disclosed, consisting of molybdenum oxide supported on alumina to increase the aromaticity of selected hydrocarbon fractions at temperatures in the range of 800° F. to 1,200° F. and pressures in the range of 100 to 1,000 pounds per square inch or higher and at space velocities in the range of 0.2 to 4.0 or higher, which conditions are also determined by the nature of the particular feed stock employed. In like manner we may employ any of the above catalysts for hydrocarbon conversion at temperatures in the range of 500° F. to 1,500° F. and at pressures in the range of −14 pounds per square inch to 1,000 pounds per square inch or higher, which temperatures and pressures are determined by the nature of the catalyst employed, the reaction desired and the character of the feed stock to be treated. Thus in the process of dehydrogenation of hydrocarbons and particularly of the normally gaseous hydrocarbons we may employ a catalyst consisting of chromium oxide distended on an alumina-silica carrier to dehydrogenate such hydrocarbons at temperatures in the range of 900° F. to 1,300° F. and at pressures in the range of −14 pounds per square inch to atmospheric or above, which catalyst is prepared according to the method of our invention by impregnating said alumina-silica carrier with a solution containing the chromium-ammonia complex.

Examples of catalyst preparations will serve to illustrate more fully the process of our invention.

*Example 1*

A desulfurization catalyst having the final composition of 12% by weight of the combined oxides of cobalt and molybdenum distended on a carrier consisting of 95% alumina and 5% silica was prepared as follows:

To a solution of 500 ml. of 0.9 specific gravity C. P. ammonium hydroxide and 100 ml. of distilled water was added slowly and with constant stirring, 292 ml. of a 3.43 molar solution of cobaltous nitrate over a period of 5 to 10 minutes. Upon contact of the cobaltous nitrate solution with the ammonium hydroxide thin tracers of cobalt hydroxide were formed but were immediately redissolved presumably forming cobalt ammonia complexes. To this solution was added 171.5 grams of ammonium paramolybdate over a period of three to five minutes. The resultant solution volume was 930 ml. and the cobalt and molybdenum concentration was 1.08 molar. To 804 ml. of this solution of cobalt and molybdenum salt was added 786 ml. or 954 grams of ⅜ inch pilled alumina-silica carrier which was allowed to soak in the impregnating solution for a period of 10 to 12 minutes and was then drained free of the solution in a Buchner funnel and subsequently partially dried by sucking air through the funnel. Further drying was accomplished by heating the impregnated pills for 16 hours at 110° C. and the dried pills were then calcined for two hours at 600° C. to effect the conversion of the adsorbed salts to the oxides. The drying and calcining temperatures are not critical inasmuch as we may dry the impregnated carrier at any moderate temperature such as from about 50° C. to about 200° C. and subsequently calcined at an elevated temperature such as about 400° C. to about 700° C. without materially affecting the finished catalyst. Upon examination of this procedure it will be seen that the original ammonium hydroxide solution prior to the addition of any salt solution was approximately 14 molar and that the mole ratio of ammonia to cobalt in the final solution was approximately 8 to 1 which conditions were satisfactory for preparing a 1.08 molar solution of cobalt and molybdenum. It is also seen that a mole concentration of ammonia imparted by the ammonium hydroxide employed was, in the final solution, approximately 9. We have found in subsequent and prior preparations of this same type catalyst that if the original ammonium hydroxide solution consisted of 17 molar ammonia the rate of solution of the cobalt hydroxide decreased markedly and the resultant precipitate was very difficult if not virtually impossible to dissolve. Likewise, if too great a dilution of the ammonium hydroxide solution was employed a similar insoluble precipitate was formed. We have also found that the addition of the molybdenum salt, in this particular instance ammonium molybdate, may be made prior to the introduction of the cobalt solution and in this case the presence of the ammonium ion furnished by the ammonium molybdate appears to accelerate the solution of the cobalt hydroxide formed during the addition.

*Example 2*

Another catalyst composed of the combined oxides of nickel and tungsten distended on alumina was prepared in a similar manner as follows:

To a solution consisting of 200 ml. of 0.9 specific gravity C. P. ammonium hydroxide, 80 ml. of water and 10 grams of amonium nitrate was added 76 ml. of a water solution of 87.3 grams of nickel nitrate (Ni(NO$_3$)$_2$.6H$_2$O). Upon making this addition a similar condition was noticed as described in the above catalyst preparation in which small quantities of nickel hydroxide were formed upon contact with the ammonia solution and immediately redissolved. Subsequent to this operation there was added 75 grams of tungstic acid ($WO_3.H_2O$) after which the volume of the solution was 510 ml. and was 0.59 molar with respect to nickel and tungsten. To 350 ml. of this solution was added 320 grams of $\frac{5}{32}$ inch alumina pills which were agitated therein for a period of 10 to 12 minutes and subsequently freed of the impregnating solution and partially dried in a Buchner funnel. The impregnated alumina was further dried for 16 hours at 120° C. and for two hours at 600° C. to give a catalyst containing 2.1 weight per cent nickel oxide, 7.5 weight per cent tungstic oxide. Examination of this preparation shows that a 14.5 molar solution of ammonia was employed containing an added 10 grams of ammonium nitrate and that the final mole ratio of ammonia to nickel, disregarding the ammonium nitrate present, was 6.8. The concentration of ammonia in the final solution, again without consideration of the ammonium nitrate, was approximately 7 molar.

Many modifications with respect to soaking time, temperature during impregnation, temperature of drying, temperature of calcination, and the like, may be employed without departing from the scope of our invention, inasmuch as our invention consists not in the steps involved in the completion of the catalyst after impregnation but in the impregnation from a new and novel type solution.

With this in mind many modifications of the impregnation procedure may occur to those skilled in the art without departing from the spirit or the scope of the following claims:

We claim:

1. A process for the catalytic conversion of hydrocarbons which comprises subjecting said hydrocarbons to a temperature between about 500° F. and about 1500° F. in the presence of a catalyst comprising a major proportion of a carrier and impregnated thereon a minor proportion of a catalytic agent, said catalytic agent consisting essentially of an oxide of a group VIII metal selected from the class consisting of iron, cobalt and nickel, combined with an oxide of a metal of the left-hand column of group VI of the periodic table, said catalyst having been prepared by a method which comprises dissolving a salt of said group VIII metal and a salt of said group VI metal in an aqueous ammonia solution so as to obtain an impregnation solution having an ammonia concentration between about 5 and 15 molar in which the molar ratio of ammonia to said group VIII metal is at least twice the ionic charge of said metal, immersing said carrier in said impregnation solution, adsorbing said solution thereon, drying the thus impregnated carrier, and calcining the dried impregnated carrier to convert the adsorbed metal compounds to the desired catalytic agent.

2. A process for the catalytic conversion of hydrocarbons which comprises subjecting said hydrocarbons to a temperature between about 500° F. and about 1500° F. in the presence of a catalyst comprising a major proportion of a carrier and impregnated thereon a minor proportion of a catalytic agent consisting essentially of the combined oxides of tungsten and a group VIII metal selected from the class consisting of iron, cobalt and nickel, said catalyst having been prepared by a method which comprises dissolving a tungsten salt and a salt of said group VIII metal in an aqueous ammonia solution so as to obtain an impregnation solution having an ammonia concentration between about 5 and 15 molar in which the molar ratio of ammonia to said group VIII metal is at least twice the ionic charge of said metal, immersing said carrier in said impregnation solution, adsorbing said solution thereon, drying the thus impregnated carrier, and calcining the dried impregnated carrier to convert the adsorbed metal compounds to the desired catalytic agent.

3. A process according to claim 2 in which the group VIII metal is cobalt.

4. A process for the catalytic conversion of hydrocarbons which comprises subjecting said hydrocarbons to a temperature between about 500° F. and about 1500° F. in the presence of a catalyst comprising a major proportion of a carrier and impregnated thereon a minor proportion of a catalytic agent consisting essentially of the combined oxides of cobalt and molybdenum, said catalyst having been prepared by a method which comprises dissolving a cobalt salt and a molybdenum salt in an aqueous ammonia solution so as to obtain an impregnation solution having an ammonia concentration between about 5 and 15 molar in which the molar ratio of ammonia to cobalt is at least twice the ionic charge of said cobalt, immersing said carrier in said impregnation solution, adsorbing said solution thereon, drying the thus impregnated carrier, and calcining the dried impregnated carrier to convert the adsorbed metal compound to the desired catalytic agent.

5. A process according to claim 4 in which the catalytic conversion is a catalytic desulfurization, and is carried out at a temperature between about 500° F. and about 1000° F., and a pressure between about atmospheric and about 1000 pounds per square inch gage, in the presence of hydrogen.

6. A process according to claim 4 in which the catalytic conversion is a catalytic dehydrogenation and is carried out at a temperature between about 900° F. and about 1200° F. and a pressure between about minus 14 pounds per square inch gage and about atmospheric.

7. A process according to claim 4 in which the catalytic conversion is a catalytic reforming and is carried out at a temperature between about 800° F. and about 1200° F. and a pressure between about 100 and about 1000 pounds per square inch gage in the presence of hydrogen.

8. A process according to claim 4 in which the solution to which the cobalt salt is added also contains an ammonium salt.

9. A process for the catalytic conversion of hydrocarbons which comprises subjecting said hydrocarbons to a temperature between about 500° F. and about 1500° F. in the presence of a catalyst comprising a major proportion of a carrier and impregnated thereon a minor proportion of a catalytic agent consisting essentially of the combined oxides of nickel and tungsten, said catalyst having been prepared by a method which comprises dissolving a nickel salt and a tungsten salt in an aqueous ammonia solution so as to obtain an impregnation solution having an ammonia concentration between about 5 and 15 molar in which the molar ratio of ammonia to nickel is at least twice the ionic charge of said nickel, immersing said carrier in said impregnaton solution, adsorbing said solution thereon, drying the thus impregnated carrier, and calcining the dried impregnated carrier to convert the adsorbed metal compounds to the desired catalytic agent.

10. A process according to claim 9 in which the catalytic conversion is a catalytic desulfurization, and is carried out at a temperature between about 500° F. and about 1000° F., and a pressure between about atmospheric and about 1000 pounds per square inch gage, in the presence of hydrogen.

11. A process according to claim 9 in which the catalytic conversion is a catalytic dehydrogenation and is carried out at a temperature between about 900° F. and about 1200° F. and a pressure between about minus 14 pounds per square inch gage and about atmospheric.

12. A process according to claim 9 in which the catalytic conversion is a catalytic reforming and is carried out at a temperature between about 800° F. and about 1200° F. and a pressure between about 100 and about 1000 pounds per square inch gage in the presence of hydrogen.

13. A process for the catalytic conversion of hydrocarbons which comprises subjecting said hydrocarbons to a temperature between about 500° F. and about 1500° F. in the presence of hydrogen and a catalyst comprising a major proportion of a carrier consisting essentially of alumina which has been activated and contains between about 1% and 15% of silica, and impregnated on said carrier a minor proportion of a catalytic agent consisting essentially of the combined oxides of cobalt and molybdenum, said catalyst having been prepared by a method which comprises adding an aqueous solution of a cobalt salt to an aqueous solution of ammonia in a concentration between about 8 and 15 molar, dissolving a molybdenum salt therein so as to obtain an impregnation solution having an ammonia concentration between about 5 and 15 molar in which the molar ratio of ammonia to cobalt is at least twice the ionic charge of said cobalt, immersing said carrier in said impregnation solution, adsorbing said solution thereon, drying the thus impregnated carrier, and calcining the dried impregnated carrier to convert the adsorbed metal compounds to the desired catalytic agent.

14. A process according to claim 1 in which the group VI metal is molybdenum.

15. A process according to claim 1 in which the group VIII metal is nickel and the group VI metal is molybdenum.

16. A process according to claim 4 in which the catalytic conversion is a catalytic desulfurization, and is carried out at a temperature between about 500° F. and about 1000° F., and a pressure between about atmospheric and about 1000 pounds per square inch gage, in the presence of hydrogen; and the carrier consists essentially of alumina which has been activated.

17. A process according to claim 9 in which the carrier consists essentially of alumina which has been activated.

PAUL G. NAHIN.
HAL C. HUFFMAN.

REFERENCES CITED

The following references are of record in the file of this patent:

UNITED STATES PATENTS

| Number | Name | Date |
|---|---|---|
| 1,956,585 | Oglesby et al. | May 1, 1934 |
| 2,162,276 | Weiss | June 13, 1939 |
| 2,205,141 | Heard | June 18, 1940 |
| 2,261,159 | Huppke | Nov. 4, 1941 |
| 2,289,924 | Morrell | July 14, 1942 |
| 2,307,689 | Layng et al. | Jan. 5, 1943 |
| 2,325,034 | Byrns | July 27, 1943 |
| 2,336,793 | Layng et al. | Dec. 14, 1943 |
| 2,348,624 | Hillman | May 9, 1944 |
| 2,369,432 | Byrns | Feb. 13, 1945 |
| 2,371,237 | Heard et al. | Mar. 13, 1945 |
| 2,393,288 | Byrns | Jan. 22, 1946 |
| 2,399,496 | Matuszak et al. | Apr. 30, 1946 |
| 2,418,309 | Matuszak et al. | Apr. 1, 1947 |
| 2,437,531 | Huffman | Mar. 9, 1948 |
| 2,437,532 | Huffman | Mar. 9, 1948 |